United States Patent
Tang

(10) Patent No.: US 7,521,513 B2
(45) Date of Patent: Apr. 21, 2009

(54) SEMI-BATCH PROCESS FOR PRODUCING FLUOROELASTOMERS

(75) Inventor: Phan Linh Tang, West Chester, PA (US)

(73) Assignee: DuPont Performance Elastomers LLC, Wilmington, DE (US)

( * ) Notice: Subject to any disclaimer, the term of this patent is extended or adjusted under 35 U.S.C. 154(b) by 24 days.

(21) Appl. No.: 11/977,021

(22) Filed: Oct. 23, 2007

(65) Prior Publication Data

US 2008/0125558 A1    May 29, 2008

Related U.S. Application Data

(60) Provisional application No. 60/861,701, filed on Nov. 29, 2006.

(51) Int. Cl.
| | |
|---|---|
| *C08F 4/00* | (2006.01) |
| *C08F 14/18* | (2006.01) |
| *C08F 114/18* | (2006.01) |
| *C08F 12/20* | (2006.01) |
| *C08F 214/18* | (2006.01) |
| *C08F 10/24* | (2006.01) |
| *C08F 116/12* | (2006.01) |
| *C08F 216/12* | (2006.01) |

(52) U.S. Cl. .................. 526/247; 526/91; 526/242; 526/250; 526/255

(58) Field of Classification Search .............. 526/255, 526/247
See application file for complete search history.

(56) References Cited

U.S. PATENT DOCUMENTS

| | | |
|---|---|---|
| 4,130,523 A | 12/1978 | Hoy et al. |
| 4,214,060 A | 7/1980 | Apotheker et al. |
| 4,281,092 A | 7/1981 | Breazeale |
| 5,216,065 A | 6/1993 | Colyer et al. |
| 5,753,742 A | 5/1998 | Bumanlag |
| 5,854,364 A | 12/1998 | Senninger et al. |
| 5,955,556 A * | 9/1999 | McCarthy et al. ........... 526/249 |
| 6,512,063 B2 | 1/2003 | Tang |

* cited by examiner

*Primary Examiner*—Marc S Zimmer
*Assistant Examiner*—Nicole M Buie

(57) ABSTRACT

A novel semi-batch emulsion polymerization process for the production of fluoroelastomers is disclosed wherein a hydrocarbon anionic surfactant is employed as the dispersing agent. The surfactant has the formula R-L-M wherein R is an alkyl group having between 6 and 17 carbon atoms, L is selected from the group consisting of $ArSO_3^-$, $SO_3^-$, $SO_4^-$, $PO_3^-$ and $COO^-$ and M is a univalent cation. Preferred surfactants are sulfonates of the formula $CH_3-(CH_2)_n-SO_3M$, $CH_3-(CH_2)_n-C_6H_4-SO_3M$, or $CH_3-(CH_2)_n-CH=CHCH_2-SO_3M$, where n is an integer from 6 to 17, or mixtures thereof, and M is a cation having a valence of 1. Surfactant is not introduced to the reactor until shortly after the polymerization reaction has begun.

7 Claims, No Drawings

SEMI-BATCH PROCESS FOR PRODUCING FLUOROELASTOMERS

CROSS REFERENCE TO RELATED APPLICATIONS

This application claims the benefit of U.S. Provisional Application No. 60/861,701 filed Nov. 29, 2006.

FIELD OF THE INVENTION

This invention pertains to a novel semi-batch emulsion polymerization process for the production of fluoroelastomers wherein a certain class of hydrocarbon anionic surfactant is employed as the dispersing agent, but not introduced to the process until a time shortly after polymerization has begun.

BACKGROUND OF THE INVENTION

Fluoroelastomers having excellent heat resistance, oil resistance, and chemical resistance have been used widely for sealing materials, containers and hoses.

Production of such fluoroelastomers by emulsion and solution polymerization methods is well known in the art; see for example U.S. Pat. Nos. 4,214,060 and 4,281,092. Generally, fluoroelastomers are produced in an emulsion polymerization process wherein a water-soluble polymerization initiator and a relatively large amount of surfactant are employed. The surfactant most often used for such processes has been ammonium perfluorooctanoate (C-8). Fluoroelastomers prepared in such processes leave the reactor in the form of a dispersion.

While C-8 works very well as a surfactant in the polymerization process, it is relatively expensive, and its future commercial availability is uncertain. Thus, it would be desirable to find other surfactants effective for use in the emulsion polymerization of fluoroelastomers.

U.S. Pat. No. 6,512,063 B2 discloses an emulsion polymerization process for the production of fluoroelastomers wherein a hydrocarbon sulfonate is employed as the dispersing agent. In this process, the surfactant is present in the reactor prior to initiation of the polymerization reaction. While the process works very well for a continuous process, the polymerization rate of a semi-batch polymerization is not suitable to sustain a commercially viable polymerization process.

It would be desirable to have a commercially attractive semi-batch emulsion polymerization process for fluoroelastomers wherein the surfactant employed is a hydrocarbon anionic surfactant rather than a fluorosurfactant.

SUMMARY OF THE INVENTION

Surprisingly, it has been found that certain hydrocarbon anionic surfactants may be used to manufacture highly fluorinated fluoroelastomers in a semi-batch process. Surfactant should not be present in the reactor before the polymerization of monomers has begun. Instead, hydrocarbon surfactant must be added to the reactor shortly after the polymerization reaction has started.

One aspect of the present invention provides a semi-batch emulsion polymerization process for the production of fluoroelastomers, said fluoroelastomers having at least 58 weight percent fluorine, comprising:

(A) charging a reactor with a quantity of an aqueous solution substantially free of surfactant;

(B) charging said reactor with a quantity of a monomer mixture comprising i) from 25 to 75 weight percent, based on total weight of the monomer mixture, of a first monomer, said first monomer selected from the group consisting of vinylidene fluoride and tetrafluoroethylene, and ii) between 75 and 25 weight percent, based on total weight of said monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof;

(C) initiating polymerization to form a fluoroelastomer dispersion while maintaining said reaction medium at a pH between 1 and 7, at a pressure between 0.5 and 10 MPa, and at a temperature between 25° C. and 130° C.; and (D) charging said reactor, after polymerization has begun, with a quantity of a hydrocarbon anionic surfactant of the formula R-L-M wherein R is an alkyl group having between 6 and 17 carbon atoms, L is selected from the group consisting of —ArSO$_3^-$, —SO$_3^-$, —SO$_4^-$, —PO$_3^-$ and —COO$^-$ and M is a univalent cation.

DETAILED DESCRIPTION OF THE INVENTION

The present invention is directed to a semi-batch emulsion polymerization process for producing a fluoroelastomer. By "fluoroelastomer" is meant an amorphous elastomeric fluoropolymer. The fluoropolymer may be partially fluorinated or perfluorinated, so long as it contains at least 58 percent by weight fluorine, preferably at least 64 wt. % fluorine. Fluoroelastomers made by the process of this invention contain between 25 to 75 weight percent, based on the weight of the fluoroelastomer, of copolymerized units of a first monomer which may be vinylidene fluoride (VF$_2$) or tetrafluoroethylene (TFE). The remaining units in the fluoroelastomers are comprised of one or more additional copolymerized monomers, different from said first monomer, selected from the group consisting of fluorine-containing olefins, fluorine-containing vinyl ethers, hydrocarbon olefins and mixtures thereof.

According to the present invention, fluorine-containing olefins copolymerizable with the first monomer include, but are not limited to, vinylidene fluoride, hexafluoropropylene (HFP), tetrafluoroethylene (TFE), 1,2,3,3,3-pentafluoropropene (1-HPFP), chlorotrifluoroethylene (CTFE) and vinyl fluoride.

The fluorine-containing vinyl ethers employed in the present invention include, but are not limited to perfluoro (alkyl vinyl) ethers. Perfluoro(alkyl vinyl) ethers (PAVE) suitable for use as monomers include those of the formula

  (I)

where R$_f$ and R$_{f''}$ are different linear or branched perfluoroalkylene groups of 2-6 carbon atoms, m and n are independently 0-10, and R$_f$ is a perfluoroalkyl group of 1-6 carbon atoms.

A preferred class of perfluoro(alkyl vinyl) ethers includes compositions of the formula

  (II)

where X is F or CF$_3$, n is 0-5, and R$_f$ is a perfluoroalkyl group of 1-6 carbon atoms.

A most preferred class of perfluoro(alkyl vinyl) ethers includes those ethers wherein n is 0 or 1 and R$_f$ contains 1-3 carbon atoms. Examples of such perfluorinated ethers include perfluoro(methyl vinyl) ether (PMVE) and perfluoro(propyl vinyl) ether (PPVE). Other useful monomers include compounds of the formula $$CF_2=CFO[(CF_2)_mCF_2CFZO]_nR_f \quad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl) ether monomers include compounds of the formula $$CF_2=CFO[(CF_2CF\{CF_3\}O)_n(CF_2CF_2CF_2O)_m(CF_2)_p]C_xF_{2x+1} \quad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2O)_mC_nF_{2n+1} \quad (V)$$

where n=1-5, m=1-3, and where, preferably, n=1.

If copolymerized units of PAVE are present in fluoroelastomers prepared by the process of the invention, the PAVE content generally ranges from 25 to 75 weight percent, based on the total weight of the fluoroelastomer. If perfluoro(methyl vinyl) ether is used, then the fluoroelastomer preferably contains between 30 and 55 wt. % copolymerized PMVE units.

Hydrocarbon olefins useful in the fluoroelastomers prepared by the process of this invention include, but are not limited to ethylene (E) and propylene (P). If copolymerized units of a hydrocarbon olefin are present in the fluoroelastomers prepared by the process of this invention, hydrocarbon olefin content is generally 4 to 30 weight percent The fluoroelastomers prepared by the process of the present invention may also, optionally, comprise units of one or more cure site monomers. Examples of suitable cure site monomers include: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP); viii) perfluoro(2-phenoxypropyl vinyl) ether; and ix) non-conjugated dienes.

Brominated cure site monomers may contain other halogens, preferably fluorine. Examples of brominated olefin cure site monomers are $CF_2$=$CFOCF_2CF_2CF_2OCF_2CF_2Br$; bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene-1; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated vinyl ether cure site monomers useful in the invention include 2-bromo-perfluoroethyl perfluorovinyl ether and fluorinated compounds of the class $CF_2Br$—R—O—CF=$CF_2$ ($R_f$ is a perfluoroalkylene group), such as $CF_2BrCF_2O$—CF=$CF_2$, and fluorovinyl ethers of the class ROCF=CFBr or ROCBr=$CF_2$ (where R is a lower alkyl group or fluoroalkyl group) such as $CH_3OCF$=CFBr or $CF_3CH_2OCF$=CFBr.

Suitable iodinated cure site monomers include iodinated olefins of the formula: CHR=CH-Z-$CH_2$CHR—I, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF$=$CF_2$ and $ICH_2CF_2O[CF(CF_3)CF_2O]_nCF$=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1 (ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodoperfluoroethyl perfluorovinyl ether are also useful cure site monomers.

Useful nitrile-containing cure site monomers include those of the formulas shown below.

$$CF_2=CF-O(CF_2)_n-CN \quad (VI)$$

where n=2-12, preferably 2-6;

$$CF_2=CF-O[CF_2-CF(CF_3)-O]_n-CF_2-CF(CF_3)-CN \quad (VII)$$

where n=0-4, preferably 0-2;

$$CF_2=CF-[OCF_2CF(CF_3)]X_x-O-(CF_2)_n-CN \quad (VIII)$$

where x=1-2, and n=1-4; and $$CF_2=CF-O-(CF_2)_n-O-CF(CF_3)CN \quad (IX)$$

where n=2-4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

Examples of non-conjugated diene cure site monomers include, but are not limited to 1,4-pentadiene; 1,5-hexadiene; 1,7-octadiene; 3,3,4,4-tetrafluoro-1,5-hexadiene; and others, such as those disclosed in Canadian Patent 2,067,891 and European Patent 0784064A1. A suitable triene is 8-methyl-4-ethylidene-1,7-octadiene.

Of the cure site monomers listed above, preferred compounds, for situations wherein the fluoroelastomer will be cured with peroxide, include 4-bromo-3,3,4,4-tetrafluorobutene-1 (BTFB); 4-iodo-3,3,4,4-tetrafluorobutene-1 (ITFB); allyl iodide; bromotrifluoroethylene and 8-CNVE. When the fluoroelastomer will be cured with a polyol, 2-HPFP or perfluoro(2-phenoxypropyl vinyl) ether is the preferred cure site monomer. When the fluoroelastomer will be cured with a tetraamine, bis(aminophenol) or bis(thioaminophenol), 8-CNVE is the preferred cure site monomer.

Units of cure site monomer, when present in the fluoroelastomers manufactured by the process of this invention, are typically present at a level of 0.05-10 wt. % (based on the total weight of the monomer mixture), preferably 0.05-5 wt. % and most preferably between 0.05 and 3 wt. %.

Specific fluoroelastomers which may be produced by the process of this invention include, but are not limited to those having at least 58 wt. % fluorine and comprising copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1;

iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl) ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl) ether and ethylene; ix) tetrafluoroethylene, perfluoro(methyl vinyl) ether, ethylene and 4-bromo-3, 3,4,4-tetrafluorobutene-1; x) tetrafluoroethylene, perfluoro(methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl) ether; xiii) tetrafluoroethylene, perfluoro(methyl vinyl) ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

Additionally, iodine-containing endgroups, bromine-containing endgroups or mixtures thereof may optionally be present at one or both of the fluoroelastomer polymer chain ends as a result of the use of chain transfer or molecular weight regulating agents during preparation of the fluoroelastomers. The amount of chain transfer agent, when employed, is calculated to result in an iodine or bromine level in the fluoroelastomer in the range of 0.005-5 wt. %, preferably 0.05-3 wt. %.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Also included are the cyano-iodine chain transfer agents disclosed European Patent 0868447A1. Particularly preferred are diiodinated chain transfer agents.

Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Other chain transfer agents suitable for use in the process of this invention include those disclosed in U.S. Pat. No. 3,707, 529. Examples of such agents include isopropanol, diethylmalonate, ethyl acetate, carbon tetrachloride, acetone and dodecyl mercaptan.

Cure site monomers and chain transfer agents may be added to the reactor neat or as solutions. In addition to being introduced into the reactor near the beginning of polymerization, quantities of chain transfer agent may be added throughout the entire polymerization reaction period, depending upon the desired composition of the fluoroelastomer being produced, the chain transfer agent being employed, and the total reaction time.

Surprisingly, it has been found that a surfactant of the formula R-L-M may be employed as the dispersing agent in the semi-batch polymerization process of this invention. In this formula, R is an alkyl group having between 6 and 17 carbon atoms, L is selected from the group consisting of —ArSO$_3^-$, —SO$_3^-$, —SO$_4^-$, —PO$_3^-$ and —COO$^-$ and M is a univalent cation. By "—ArSO$_3^-$" is meant an aryl sulfonate. Specific examples include CH$_3$—(CH$_2$)$_n$—SO$_3$M, CH$_3$—(CH$_2$)$_n$—C$_6$H$_4$—SO$_3$M, CH$_3$—(CH$_2$)$_n$—CH=CHCH$_2$—SO$_3$M, CH$_3$—(CH$_2$)$_n$—SO$_4$M, CH$_3$—(CH$_2$)$_n$—PO$_3$M, and CH$_3$—(CH$_2$)$_n$—COOM. Surfactants of formula CH$_3$—(CH$_2$)$_n$—SO$_3$M and CH$_3$—(CH$_2$)$_n$—C$_6$H$_4$—SO$_3$M are preferred. Surfactant of formula CH$_3$—(CH$_2$)$_n$—SO$_3$M is especially preferred. In these formulae n is an integer from 6 to 17, preferably 7 to 14. The surfactant may also be a mixture of species of the same general formula, each having a different value of n. M is a univalent cation (e.g. H$^+$, Na$^+$, K$^+$, NH$_4^+$, etc.). Surfactants having n values less than 6 tend to be poor soaps and poor dispersing agents for highly fluorinated fluoroelastomer latex particles. Surfactants having n values greater than 17 tend to be insufficiently soluble in water to be useful in this invention, or form insoluble salts with coagulants which are difficult to wash from fluoroelastomer crumb. The dispersing agent may also be a mixture of any two or more surfactants of the above general formulae. Specific examples of surfactants which may be employed in the emulsion polymerization process of the invention include, but are not limited to CH$_3$—(CH$_2$)$_7$—SO$_3$Na; and CH$_3$—(CH$_2$)$_{11}$C$_6$H$_4$—SO$_3$Na.

The amount of surfactant to be employed in the aqueous emulsion polymerization solution is determined by balancing emulsion stability and polymerization rate with foam generation. If too little surfactant is used, excessive reactor fouling will occur and reaction rate may be undesirably slow. If too much surfactant is used, excessive foam will be generated and it will be difficult to remove the excess surfactant from the fluoroelastomer, thus retarding the vulcanization of the fluoroelastomer with bisphenol curatives. In an emulsion polymerization process of this invention, the amount of surfactant employed is typically 0.05 to 3 wt. %, based on the total weight of fluoroelastomer being produced. The preceding amounts are based on the amount of active ingredient, not on amount of a surfactant solution containing less that 100% active ingredient.

In the semi-batch emulsion polymerization process of this invention, a gaseous monomer mixture of a desired composition (initial monomer charge) is introduced into a reactor which contains an aqueous solution. The reactor is typically not completely filled with the aqueous solution, so that a vapor space remains. The aqueous solution is substantially free of surfactant until the polymerization reaction has been initiated. By "substantially free" is meant less than 500 parts per million by weight (ppm) surfactant, preferably 0 ppm.

Optionally, the aqueous solution may contain a pH buffer, such as a phosphate or acetate buffer for controlling the pH of the polymerization reaction. Instead of a buffer, a base, such as NaOH may be used to control pH. Generally, pH is controlled to between 1 and 7 (preferably 3-7), depending upon the type of fluoroelastomer being prepared.

Alternatively, or additionally, pH buffer or base may be added to the reactor at various times throughout the polymerization reaction, either alone or in combination with other ingredients such as polymerization initiator, liquid cure site monomer, or chain transfer agent. Also optionally, the initial aqueous solution may contain a water-soluble inorganic peroxide polymerization initiator. In addition, the initial aqueous solution may contain a nucleating agent, such as a fluoroelastomer seed polymer prepared previously, in order to promote fluoroelastomer latex particle formation and thus speed up the polymerization process.

The initial monomer charge contains a quantity of a first monomer of either TFE or VF$_2$ and one or more additional monomers which are different from the first monomer. The amount of monomer mixture contained in the initial charge is set so as to result in a reactor pressure between 0.5 and 10 MPa.

The monomer mixture is dispersed in the aqueous medium and, optionally, a chain transfer agent may also be added at this point while the reaction mixture is agitated, typically by mechanical stirring. In the initial gaseous monomer charge, the relative amount of each monomer is dictated by reaction kinetics and is set so as to result in a fluoroelastomer having the desired ratio of copolymerized monomer units (i.e. very slow reacting monomers must be present in a higher amount relative to the other monomers than is desired in the composition of the fluoroelastomer to be produced).

The temperature of the semi-batch reaction mixture is maintained in the range of 25° C.-130° C., preferably 50° C.-100° C. Polymerization begins when the initiator either thermally decomposes or reacts with reducing agent and the resulting radicals react with dispersed monomer.

It is important that hydrocarbon anionic surfactant be introduced to the reactor shortly after the polymerization reaction begins. The reactor must be substantially free of such surfactant prior to initiation or the polymerization rate of a semi-batch process will be drastically reduced. It is also important that surfactant be added to the reactor before the polymerization reaction has been running for too long or the fluoroelastomer dispersion becomes unstable and reactor fouling occurs.

Additional quantities of the gaseous major monomers and cure site monomer (incremental feed) are added at a controlled rate throughout the polymerization in order to maintain a constant reactor pressure at a controlled temperature. The relative ratio of monomers contained in the incremental feed is set to be approximately the same as the desired ratio of copolymerized monomer units in the resulting fluoroelastomer. Thus, the incremental feed contains between 25 to 75 weight percent, based on the total weight of the monomer mixture, of a first monomer of either TFE or $VF_2$ and 75 to 25 weight percent of one or more additional monomers that are different from the first monomer. Chain transfer agent may also, optionally, be introduced into the reactor at any point during this stage of the polymerization. Typically, additional polymerization initiator and hydrocarbon anionic surfactant are also fed to the reactor during this stage of polymerization. The amount of polymer formed is approximately equal to the cumulative amount of incremental monomer feed. One skilled in the art will recognize that the molar ratio of monomers in the incremental feed is not necessarily exactly the same as that of the desired (i.e. selected) copolymerized monomer unit composition in the resulting fluoroelastomer because the composition of the initial charge may not be exactly that required for the selected final fluoroelastomer composition, or because a portion of the monomers in the incremental feed may dissolve into the polymer particles already formed, without reacting. Polymerization times in the range of from 2 to 30 hours are typically employed in this semi-batch polymerization process.

In the process of this invention, the polymerization temperature is maintained in the range of 25°-130° C. If the temperature is below 25° C., the rate of polymerization is too slow for efficient reaction on a commercial scale, while if the temperature is above 130° C., the reactor pressure required in order to maintain polymerization is too high to be practical.

The polymerization pressure is controlled in the range of 0.5 to 10 MPa, preferably 1 to 6.2 MPa. In a semi-batch process, the desired polymerization pressure is initially achieved by adjusting the amount of gaseous monomers in the initial charge, and after the reaction is initiated, the pressure is adjusted by controlling the incremental gaseous monomer feed. The polymerization pressure is set in the above range because if it is below 1 MPa, the monomer concentration in the polymerization reaction system is too low to obtain a satisfactory reaction rate. In addition, the molecular weight does not increase sufficiently. If the pressure is above 10 MPa, the cost of the required high pressure equipment is very high.

The amount of fluoroelastomer copolymer formed is approximately equal to the amount of incremental feed charged, and is in the range of 10-30 parts by weight of copolymer per 100 parts by weight of aqueous medium, preferably in the range of 20-25 parts by weight of the copolymer. The degree of copolymer formation is set in the above range because if it is less than 10 parts by weight, productivity is undesirably low, while if it is above 30 parts by weight, the solids content becomes too high for satisfactory stirring.

Water-soluble peroxides which may be used to initiate polymerization in this invention include, for example, the ammonium, sodium or potassium salts of hydrogen persulfate. In a redox-type initiation, a reducing agent such as sodium sulfite, is present in addition to the peroxide. These water-soluble peroxides may be used alone or as a mixture of two or more types. The amount to be used is selected generally in the range of 0.01 to 0.4 parts by weight per 100 parts by weight of polymer, preferably 0.05 to 0.3. During polymerization some of the fluoroelastomer polymer chain ends are capped with fragments generated by the decomposition of these peroxides.

Optionally, fluoroelastomer gum or crumb may be isolated from the fluoroelastomer dispersions produced by the process of this invention by the addition of a coagulating agent to the dispersion. Any coagulating agent known in the art may be used. Preferably, a coagulating agent is chosen which forms a water-soluble salt with the surfactant contained in the dispersion. Otherwise, precipitated surfactant salt may become entrained in the isolated fluoroelastomer and then retard curing of the fluoroelastomer with bisphenol-type curatives.

In one isolation process, the fluoroelastomer dispersion is adjusted to a pH less than 4 and then coagulated by addition of an aluminum salt. Undesirable insoluble aluminum hydroxides form at pH values greater than 4. Aluminum salts useful as coagulating agents include, but are not limited to aluminum sulfate and alums of the general formula M'Al $(SO_4)_2 \cdot 12H_2O$, wherein M' is a univalent cation, other than lithium. The resulting coagulated fluoroelastomer may then be filtered, washed and dried.

In addition to aluminum salts, common coagulants such as calcium salts (e.g. calcium nitrate) or magnesium salts (e.g. magnesium sulfate), and some salts of univalent cations (e.g. sodium chloride or potassium chloride), may be used to coagulate fluoroelastomers produced in a process employing a surfactant that forms a water soluble salt with such coagulants.

The fluoroelastomers prepared by the process of this invention are useful in many industrial applications including seals, wire coatings, tubing and laminates.

EXAMPLES

Test Methods

Mooney viscosity, ML (1+10), was determined according to ASTM D1646 with an L (large) type rotor at 121° C., using a preheating time of one minute and rotor operation time of 10 minutes.

Inherent viscosity was measured at 30° C. and methyl ethyl ketone was employed as solvent (0.1 g polymer in 100 ml solvent).

The invention is further illustrated by, but is not limited to, the following examples.

Example 1

A 40-liter reactor was charged with 25 liters of deionized, deoxygenated water, and 37 g of sodium phosphate dibasic heptahydrate. The reactor was heated to 80° C. and then pressurized to 2.07 MPa with a mixture of 30.0 weight percent (wt. %) vinylidene fluoride ($VF_2$) and 70 wt. % hexafluoropropylene (HFP). A 100 ml aliquot of a solution containing 4.8 wt % sodium phosphate dibasic heptahydrate and 2 wt. % ammonium persulfate initiator was then added. A mixture of 60.0 wt. % $VF_2$ and 40.0 wt. % HFP was supplied to the reactor to maintain a pressure of 2.07 MPa throughout the polymerization. After 90 g of monomer mixture was reacted, 1 ml of a 40 wt % solution of sodium octyl sulfonate (SOS) and 17.72 ml of isopropanol was added to the reactor. Every 30 minutes, an aliquot of between 0 and 10 ml of initiator solution was added in order to maintain a reaction rate of 1000 grams monomer mixture per hour. Every 30 minutes, an aliquot of 40 wt % SOS solution was added to the reactor in or to maintain a ratio of 0.00808 ml 40 wt % SOS per gram of monomer mixture fed. After a total of 8333 g monomer mixture was supplied to the reactor, monomer addition was discontinued and the reactor was purged of residual monomer. It took a total reaction time of 10.2 hours to make 8333 g of polymer. A total of 25.0 g of SOS and a total of 5.8 g ammonium persulfate was fed during the polymerization. The resulting latex had a solids content of 24.8 wt. % and a pH of 4.15. The fluoroelastomer was coagulated with aluminum sulfate solution. The crumb was filtered, washed with deionized water and dried. The resulting fluoroelastomer had an inherent viscosity of 0.99 dl/g, a ML(1+10) at 121° C. of 46 and contained 61.1 wt. % VF2 and 38.9 wt. % HFP.

Comparative A

In this comparative process, sodium octyl sulfonate (SOS) was added to the reactor with the initiator, i.e. prior to when the polymerization reaction had begun. A 40-liter reactor was charged with 25 liters of deionized, deoxygenated water, and 37 g of sodium phosphate dibasic heptahydrate. The reactor was heated to 80° C. and then pressurized to 2.07 MPa with a mixture of 30.0 wt. % vinylidene fluoride ($VF_2$) and 70 wt. % hexafluoropropylene (HFP). A 100 ml aliquot of a 4.8 wt % sodium phosphate dibasic heptahydrate, 8 wt % SOS and 2 wt. % ammonium persulfate initiator solution was then added. A mixture of 60.0 wt. % $VF_2$ and 40.0 wt. % HFP was supplied to the reactor to maintain a pressure of 2.07 MPa throughout the polymerization. In order to maintain a reaction rate of 1000 grams monomer mixture per hour, aliquots of between 0 and 10 ml of initiator solution were added every 30 minutes. After a total of 4644 g monomer mixture was supplied to the reactor and the total reaction time of 13 hours, monomer addition was discontinued and the reactor was purged of residual monomer. It took a total reaction time of 10.5 hours to make 3578 g of polymer. A total of 28.8 g SOS and a total of 7.2 g ammonium persulfate was fed during the polymerization. The resulting latex had a solids content of 15.7 wt. % and a pH of 3.81. The fluoroelastomer was coagulated with aluminum sulfate solution. The crumb was filtered, washed with deionized water and dried.

Comparative B

In this comparative process, sodium octyl sulfonate (SOS) was added to the reactor prior to the introduction of the fluoromonomers, i.e. prior to initiation of the polymerization reaction. A 40-liter reactor was charged with 25 liters of deionized, deoxygenated water, 55.8 ml of a solution of 40 wt % SOS (equivalent to 25 g SOS), and 37 g of sodium phosphate dibasic heptahydrate. The reactor was heated to 80° C. and then pressurized to 2.07 MPa with a mixture of 30.0 wt. % vinylidene fluoride ($VF_2$) and 70 wt. % hexafluoropropylene (HFP). A 100 ml aliquot of a 4.8 wt % sodium phosphate dibasic heptahydrate and 2 wt. % ammonium persulfate initiator solution was then added. A mixture of 60.0 wt. % $VF_2$ and 40.0 wt. % HFP was supplied to the reactor to maintain a pressure of 2.07 MPa throughout the polymerization. In order to maintain a reaction rate of 1000 grams monomer mixture per hour, aliquots of between 0 and 10 ml of initiator solution were added every 30 minutes. After a total of 8333 g monomer mixture was supplied to the reactor and the total reaction time of 15.3 hours, monomer addition was discontinued and the reactor was purged of residual monomer. It took a total reaction time of 10.5 hours to make 4290 g of polymer. A total of 7.8 g ammonium persulfate was fed during the polymerization The resulting latex had a solids content of 24.7 wt. % and a pH of 4.09. The fluoroelastomer was coagulated with aluminum sulfate solution. The crumb was filtered, washed with deionized water and dried.

Example 2

A 40-liter reactor was charged with 25 liters of deionized, deoxygenated water, and 37 g of sodium phosphate dibasic heptahydrate. The reactor was heated to 80° C. and then pressurized to 2.07 MPa with a mixture of 10.0 wt. % vinylidene fluoride ($VF_2$), 80 wt. % hexafluoropropylene (HFP), and 10.0 wt. % tetrafluoroethylene (TFE). A 100 ml aliquot of a solution containing 5 wt % sodium phosphate dibasic heptahydrate and 1 wt. % ammonium persulfate initiator was then added. A mixture of 34.0 wt. % $VF_2$, 38.0 wt. % HFP, and 28.0 wt % TFE was supplied to the reactor to maintain a pressure of 2.07 MPa throughout the polymerization. After 90 g of monomer mixture was reacted, a 40 wt % SOS solution was fed to the reactor at a rate based on 0.019 ml of 40 wt. % SOS per gram of monomer mixture fed, and feeding ceased when 74.4 ml of 40 wt % SOS had been fed. Every 30 minutes, an aliquot of between 0 and 15 ml of initiator solution was added in order to maintain a reaction rate of 750 grams monomer mixture per hour. After a total of 8333 g monomer mixture was supplied to the reactor, monomer addition was discontinued and the reactor was purged of residual monomer. It took a total reaction time of 11.8 hours to make 8333 g of polymer. A total 3.2 g ammonium persulfate was fed during the polymerization. The resulting latex had a solids content of 24.7 wt. % and a pH of 4.09. The fluoroelastomer was coagulated with aluminum sulfate solution. The crumb was filtered, washed with deionized water and dried.

What is claimed is:

1. A semi-batch emulsion polymerization process for the production of a fluoroelastomer, said fluoroelastomer having at least 58 weight percent fluorine, comprising:
   (A) charging a reactor with a quantity of an aqueous solution substantially free of surfactant;
   (B) charging said reactor with a quantity of a monomer mixture comprising i) from 25 to 75 weight percent, based on total weight of the monomer mixture, of a first monomer, said first monomer selected from the group consisting of vinylidene fluoride and tetrafluoroethylene, and ii) between 75 and 25 weight percent, based on total weight of said monomer mixture, of one or more additional copolymerizable monomers, different from said first monomer, wherein said additional monomer is selected from the group consisting of fluorine-containing olefins, fluorine-containing vinyl ethers, hydrocarbon olefins and mixtures thereof;

(C) initiating polymerization to form a fluoroelastomer dispersion while maintaining said reaction medium at a pH between 1 and 7, at a pressure between 0.5 and 10 MPa, and at a temperature between 25° C. and 130° C.; and (D) charging said reactor, after polymerization has begun, with a quantity of a hydrocarbon anionic surfactant of the formula R-L-M wherein R is an alkyl group having between 6 and 17 carbon atoms, L is selected from the group consisting of $-ArSO_3^-$, $-SO_3^-$, $-SO_4^-$, $-PO_3^-$ and $-COO^-$ and M is a univalent cation.

2. The semi-batch emulsion polymerization process of claim 1 further comprising (E) isolating fluoroelastomer from said dispersion by addition of a coagulating agent.

3. The semi-batch emulsion polymerization process of claim 1 wherein said surfactant is selected from the group consisting of $CH_3-(CH_2)_n-SO_3M$, $CH_3-(CH_2)_n-C_6H_4-SO_3M$, $CH_3-(CH_2)_n-CH=CHCH_2-SO_3M$, $CH_3-(CH_2)_n-SO_4M$, $CH_3-(CH_2)_n-PO_3M$, and $CH_3-(CH_2)_n-COOM$, wherein n is an integer from 6 to 17.

4. The semi-batch emulsion polymerization process of claim 3 wherein said surfactant is $CH_3-(CH_2)_n-SO_3M$, wherein n is an integer from 7 to 14.

5. The semi-batch emulsion polymerization process of claim 1 further comprising charging said reactor with a chain transfer agent.

6. The semi-batch emulsion polymerization process of claim 1 wherein said monomer mixture further comprises 0.05 to 10 weight percent, based on total weight of the monomer mixture, of a cure site monomer.

7. The semi-batch emulsion polymerization process of claim 1 wherein said fluoroelastomer comprises copolymerized monomer units selected from the group consisting of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl) ether, tetrafluoroethylene and 4-bromo-3,3,4,4-tetrafluorobutene-1; vi) vinylidene fluoride, perfluoro(methyl vinyl) ether, tetrafluoroethylene and 4-iodo-3,3,4,4-tetrafluorobutene-1; vii) vinylidene fluoride, perfluoro(methyl vinyl) ether, tetrafluoroethylene and 1,1,3,3,3-pentafluoropropene; viii) tetrafluoroethylene, perfluoro(methyl vinyl) ether and ethylene; ix) tetrafluoroethylene, perfluoro(methyl vinyl) ether, ethylene and 4-bromo-3,3,4,4-tetrafluorobutene-1; x) tetrafluoroethylene, perfluoro(methyl vinyl) ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl) ether; xiii) tetrafluoroethylene, perfluoro(methyl vinyl) ether and perfluoro(8-cyano-5-methyl-3,6-dioxa-1-octene); xiv) tetrafluoroethylene, perfluoro(methyl vinyl) ether and 4-bromo-3,3,4,4-tetrafluorobutene-1; xv) tetrafluoroethylene, perfluoro(methyl vinyl) ether and 4-iodo-3,3,4,4-tetrafluorobutene-1; and xvi) tetrafluoroethylene, perfluoro(methyl vinyl) ether and perfluoro(2-phenoxypropyl vinyl) ether.

* * * * *